(12) United States Patent
Rigato et al.

(10) Patent No.: US 9,946,093 B2
(45) Date of Patent: Apr. 17, 2018

(54) OPHTHALMIC LENS WITH A BASE OF POLYMERIC MATERIAL AND A COATING HAVING AN INTERFERENTIAL, ANTI-REFLECTIVE, ANTI-IRIDESCENT AND INFRARED FILTER MULTIPLE LAYER STRUCTURE COATING

(71) Applicant: INDO OPTICAL S.L., Sant Cugat del Vallès, Barcelona (ES)

(72) Inventors: Franco Rigato, Barcelona (ES); Glòria Casanellas Peñalver, Barcelona (ES); Pau Artús Colomer, Barcelona (ES); Antoni Vilajoana Mas, Barcelona (ES); Juan Carlos Dürsteler López, Barcelona (ES)

(73) Assignee: HORIZONS OPTICAL S.L.U., Sant Cugat Del Vallès, (Barcelona) (ES)

( * ) Notice: Subject to any disclaimer, the term of this patent is extended or adjusted under 35 U.S.C. 154(b) by 458 days.

(21) Appl. No.: 14/553,428

(22) Filed: Nov. 25, 2014

(65) Prior Publication Data
US 2015/0146161 A1    May 28, 2015
US 2017/0131572 A2    May 11, 2017

(30) Foreign Application Priority Data

Nov. 27, 2013  (ES) .................................. 201331729

(51) Int. Cl.
*B32B 15/04*  (2006.01)
*B32B 17/06*  (2006.01)
(Continued)

(52) U.S. Cl.
CPC ............... *G02C 7/107* (2013.01); *G02B 1/14* (2015.01); *G02C 2202/16* (2013.01)

(58) Field of Classification Search
USPC ........ 428/688, 687, 697, 698, 699, 701, 702
See application file for complete search history.

(56) References Cited

U.S. PATENT DOCUMENTS 6,250,758  B1 *  6/2001  Yoshihara ............... B32B 15/08
                                                351/159.63
2010/0238557 A1 *  9/2010  Tomoda .................. G02B 1/111
                                                359/586
(Continued)

OTHER PUBLICATIONS

Spanish Search Report completed Nov. 4, 2014 in Application No. 201331729.

*Primary Examiner* — Lauren R Colgan
(74) *Attorney, Agent, or Firm* — Staas & Halsey LLP

(57) ABSTRACT

Ophthalmic lens including a base of polymeric material with a coating having an interferential, anti-reflective, anti-iridescent and infrared filter multiple layer structure. An interphase, a first layer (of 91-169 nm) with a refraction index higher than 1.8, a second layer (of 128-248 nm) with a refraction index lower than 1.65, a third layer (of 73-159 nm) with a refraction index higher than 1.8 and a fourth layer (of 40-138 nm) with a refraction index lower than 1.8. A total thickness of the multiple layer structure is less than 600 nm. The structure can have intermediate layers with intermediate refraction indices, in which case a doublet of two adjacent layers that fulfill the thicknesses above is replaced by a triplet so that the thickness and an optical thickness of the triplet differ from those of the doublet by less than 5%, respectively.

21 Claims, 15 Drawing Sheets

(51) Int. Cl.
  *G02C 7/10* (2006.01)
  *G02B 1/14* (2015.01)

(56) References Cited

U.S. PATENT DOCUMENTS

| | | | |
|---|---|---|---|
| 2011/0033681 A1* | 2/2011 | Adachi | G02B 1/115 |
| | | | 428/212 |
| 2011/0228214 A1* | 9/2011 | von Blanckenhagen | G02B 1/115 |
| | | | 351/159.24 |
| 2013/0038834 A1* | 2/2013 | Cado | G02B 1/115 |
| | | | 351/159.62 |
| 2013/0135742 A1* | 5/2013 | Fukagawa | G02B 1/115 |
| | | | 359/580 |

* cited by examiner

OPHTHALMIC LENS WITH A BASE OF POLYMERIC MATERIAL AND A COATING HAVING AN INTERFERENTIAL, ANTI-REFLECTIVE, ANTI-IRIDESCENT AND INFRARED FILTER MULTIPLE LAYER STRUCTURE COATING

CROSS-REFERENCE TO RELATED APPLICATIONS

This application claims the foreign priority benefit of Spanish Patent Application No. P201331729 filed Nov. 27, 2013, the contents of which are incorporated herein by reference.

FIELD OF THE INVENTION

The invention relates to an ophthalmic lens having a base of polymeric material with a coating having an interferential multiple layer structure.

BACKGROUND

The technology of multiple layer structures is known for creating interferential effects on optical surfaces.

In the field of ophthalmic lenses, it is usual to use interferential multiple layer structures to create anti-reflective or reflective surfaces of different intensities and residual colors, usually anti-reflective of green color with visible light reflection percentages lower than 2.5%, or even lower than 1.5% for each surface including a multiple layer structure.

Also known is the use of treatments for filtering a percentage of the IRA (infra-red A) or blue radiation selectively. However, the IR light filtering requires complex solutions that are not easily applicable to transparent lenses without coloring. In particular, layers of metals can be applied that absorb or help to reflect part of the IRA radiation but these materials absorb at the same time visible light, and so they do not enable obtaining high visible transmittance lenses with these features.

Interferential filters exist (for example the ones of the heat mirror type) that are used in applications for precision optics on a mineral lens, and they enable reducing the IRA radiation transmittance while maintaining a high visible transmittance: these filters have a multiple layer structure with between 40 and 100 layers and they have a total thickness over 1000 nm (nanometers), These filters are designed specifically for a certain angle of incidence of the incident radiation, and therefore if the angle varies, they display the typical effects of iridescence. Also, these treatments usually have a slight residual coloring which, in comparison with the anti-reflective lenses, makes them rather unattractive in aesthetic terms.

SUMMARY OF THE INVENTION

An object of the invention is to overcome these drawbacks. This purpose is achieved by means of an ophthalmic lens of the type indicated at the beginning wherein the multiple layer structure includes:
  an interphase, orientated towards the base, of a material from the group made up of $SiO_x$, $SiO_2$, Cr, Ni/Cr, $SnO_2$, $Al_2O_3$, AlN, ZnO, SiO/Cr, $SiO_x/Al_2O_3$, ITO, $MoO_3$, with a thickness between 0 and 150 nm, preferably between 5 and 25 nm
  a first high refraction index layer, of a material from the group made up of oxides, nitrides or oxynitrides of Zr, Ti, Sb, In, Sn, Ta, Nb, Hf and mixtures thereof, with a refraction index $n_D$ higher than 1.8,
  a second low refraction index layer, of a material from the group made up of $SiO_2$, $MgF_2$, $Al_2O_3$, $LaF_3$ and mixtures thereof, with a refraction index $n_D$ lower than 1.65,
  a third high refraction index layer made of a material from the group made up of oxides, nitrides or oxynitrides Zr, Ti, Sb, In, Sn, Ta, Nb, Hf and mixtures thereof, with a refraction index $n_D$ higher than 1.8,
  a fourth layer, made of a material from the group made up of $SiO_2$, $MgF_2$, $Al_2O_3$, $LaF_3$ and mixtures thereof, with a refraction index $n_0$ lower than 1.8,
  where between the interphase and the first high refraction index layer there is a first intermediate layer 7 (FIG. 2) with a refraction index $n_D$ lower than 1.8 and with a thickness of between 0 and 160 nm,
  where between the first high refraction index layer and the second low refraction index layer there is a second intermediate layer 6 (FIG. 2) with a refraction index $n_D$ between 1.65 and 1.8 and with a thickness of between 0 and 100 nm,
  where between the second low refraction index layer and the third high refraction index layer there is a third intermediate layer 5 (FIG. 2) with a refraction index $n_D$ between 1.65 and 1.8 and with a thickness between 0 and 110 nm,
  where the total thickness of the multiple layer structure is at the most 600 nm, measured from the start of the interphase to the end of the fourth layer, and where, if there is none of said intermediate layers, the thickness of said first high refraction index layer is between 91 and 169 nm, preferably between 101 and 159 nm, the thickness of said second low refraction index layer is between 128 and 248 nm, preferably between 138 and 240 nm, the thickness of said third high refraction index layer is between 73 and 159 nm, preferably between 83 and 147 nm, and the thickness of said fourth layer is between 40 and 138 nm,
  and, if there is one of said intermediate layers, it holds that:
    the doublet made up of the first high refraction index layer and the second low refraction index layer that fulfil said thicknesses is replaced by a triplet made up of a first intermediate layer, a first high refraction index layer and a second low refraction index layer such that the thickness of said triplet differs from the thickness of said doublet by less than 5%, and such that the optical thickness of said triplet differs from the optical thickness of said doublet by less than 5%,
    and/or
    the doublet made up of the first high refraction index layer and the second low refraction index layer which fulfil said thicknesses is replaced by a triplet made up of a first high refraction index layer, a second intermediate layer and a second low refraction index layer such that the thickness of said triplet differs from the thickness of said doublet by less than 5%, and such that the optical thickness of said triplet differs from the optical thickness of said doublet by less than 5%,
    and/or
    the doublet made up of the second low refraction index layer and the third high refraction index layer which fulfil said thicknesses is replaced by a triplet made up of a second low refraction index layer, a third intermediate layer and a third high refraction index layer such that the thickness of said triplet differs from the thickness of said doublet by less than 5%, and such that the optical thickness of said triplet differs from the optical thickness of said doublet by less than 5%.

In fact, this way a multiple layer structure is obtained that reflects a significant percentage of infra-red radiation while it maintains the anti-reflective properties in the visible, with a limited angular dispersion in the residual reflection, by adapting standard anti-reflective filter technology.

Multiple layers exist in the market for ophthalmic products, which are anti-reflective, with an infra-red filter or which limit the angular dispersion in the residual reflection, but there is no solution that groups together these four characteristics in one and the same treatment with a total thickness of less than 600 nm. This is due to the fact that each of the desired effects is achieved by including a group of layers specifically designed to fulfil the specific function in question (anti-reflective, IR filter or angular dispersion limiter in the residual reflection). This way, the total of the multiple layer structure has a plurality of layers and a high thickness. This high thickness produces secondary mechanical effects (residual stress, cracking, delamination) which, although they are maintained within acceptable values in the case of mineral precision optics lenses, they are not acceptable in the case of ophthalmic organic based lenses. Even if the amount of filtered IRA light is reduced, you still need a high overall thickness to maintain some standard anti-reflective characteristics in the visible spectrum of the ophthalmic sector.

However, it has been discovered that there is a very specific subset of thicknesses of interferential multiple layers, with an overall thickness less than 600 nm, which allows obtaining at the same time an anti-reflective treatment in the visible with low angular dispersion in the residual reflection (a visible reflection less than 5% for an incident angle of 60°, preferably less than 4%), and partially reflecting the IR-A light (an average transmission of between 780 and 1400 nm less than 76%, preferably less than 70%). The singularity of this subset of treatment layer thicknesses is revealed because when varying the thickness of each layer within a relatively small range, and without exceeding 600 nm total, some of the three desired requirements are not fulfilled.

The ranges of thicknesses that include the value "0" (for example, "from 0 to 150 nm" mean that the layer in question is optional (the value "0" is equivalent to saying that said layer is not present).

Preferably, in the event that there is none of the intermediate layers, the thickness x of the first high refraction index layer, the thickness y of the second low refraction index layer, the thickness z of the third high refraction index layer and the thickness t of the fourth layer fulfil the following relation:

$$(xyzt) - (129.5 \quad 188.3 \quad 116.0 \quad 89.0) \cdot A \cdot \begin{pmatrix} x - 129.5 \\ y - 188.3 \\ z - 116.0 \\ t - 89.0 \end{pmatrix} \leq 1 \text{ where}$$

$$A = \begin{pmatrix} 8.29 \cdot 10^{4} & -1.76 \cdot 10^{-4} & -1.18 \cdot 10^{-4} & 1.50 \cdot 10^{-4} \\ -1.76 \cdot 10^{-4} & 3.34 \cdot 10^{-4} & -1.80 \cdot 10^{-5} & -3.50 \cdot 10^{-5} \\ -1.18 \cdot 10^{-4} & -1.80 \cdot 10^{-5} & 7.16 \cdot 10^{-4} & -2.60 \cdot 10^{-4} \\ 1.50 \cdot 10^{-4} & -3.50 \cdot 10^{-5} & -2.60 \cdot 10^{-4} & 5.34 \cdot 10^{-4} \end{pmatrix}$$

and, if there is one of the intermediate layers, it holds that:
the doublet made up of the first high refraction index layer and the second low refraction index layer that that fulfil the relation above is replaced by a triplet made up of a first intermediate layer, a first high refraction index layer and a second low refraction index layer such that the thickness of said triplet differs from the thickness of said doublet by less than 5%, and such that the optical thickness of said triplet differs from the optical thickness of said doublet by less than 5%, and/or the doublet made up of the first high refraction index layer and the second low refraction index layer which fulfil the relation above is replaced by a triplet made up of a first high refraction index layer, a second intermediate layer and a second low refraction index layer such that the thickness of said triplet differs from the thickness of said doublet by less than 5%, and such that the optical thickness of said triplet differs from the optical thickness of said doublet by less than 5%, and/or the doublet made up of the second low refraction index layer and the third high refraction index layer which fulfil the relation above is replaced by a triplet made up of a second low refraction index layer, a third intermediate layer and a third high refraction index layer such that the thickness of said triplet differs from the thickness of said doublet by less than 5%, and such that the optical thickness of said triplet differs from the optical thickness of said doublet by less than 5%.

Advantageously the thickness x of the first high refraction index layer, the thickness y of the second low refraction index layer, the thickness z of the third high refraction index layer and the thickness t of the fourth layer fulfil the following relation:

$$(xyzt) - (129.7 \quad 189.7 \quad 114.2 \quad 87.2) \cdot A \cdot \begin{pmatrix} x - 129.7 \\ y - 189.7 \\ z - 114.2 \\ t - 87.2 \end{pmatrix} \leq 1 \text{ where}$$

$$A = \begin{pmatrix} 1.53 \cdot 10^{-3} & -3.41 \cdot 10^{-4} & -1.35 \cdot 10^{-4} & 8.99 \cdot 10^{-5} \\ -3.41 \cdot 10^{-4} & 4.82^{-4} & -1.86 \cdot 10^{-5} & 9.77 \cdot 10^{-6} \\ -1.35 \cdot 10^{-4} & -1.86 \cdot 10^{-5} & 1.12 \cdot 10^{-3} & -2.53 \cdot 10^{-4} \\ 8.99 \cdot 10^{-5} & 9.77 \cdot 10^{-6} & -2.53 \cdot 10^{-4} & 8.44 \cdot 10^{-4} \end{pmatrix}$$

and, if there are some of the intermediate layers, preferably they fulfil the same relations above.

Preferably a simulation of the reflection and transmission curves of the multiple layer structure has the following characteristics:

a visible reflection $R_{vis}$ by a light incidence angle of 15° lower than 2.5%, preferably lower than 1.5%; calculated as an average of the reflection value in the range 380-780 nm, weighted by the spectral light efficiency spectrum for day light and by the spectral distribution of the lighting D65, according to Spanish standard UNI-EN ISO 13666:1998, a visible reflection $R_{vis}$ by a light incidence angle of 60° lower than 5.0%, preferably lower than 4.5%; calculated as in the case above, and a transmission value in infra-red A $T_{IR-A}$ lower than 76%, preferably lower than 70%; calculated as an average transmission value in the range 780-1400 nm according to the following formula:

$$T_{IR-A} = \sum_{\lambda \in A} \frac{T(\lambda)}{14} \text{ where } A = \{780, 800, 850, 900, 950,$$
$$1000, 1050, 1100, 1150, 1200, 1250, 1300, 1350, 1400\}$$

In fact, the combination of these three properties within the ranges indicted makes it possible to obtain lenses with optimum results. The parameters indicated are usual in the state of the art, are clearly determined and they can be obtained in a reliable manner by following the specified standards, that include some procedures for determining the values of the parameters in question in an objective manner and common to the state of the art.

Advantageously a simulation of the reflection and transmission curves of the multiple layer structure has a blue light transmittance value $T_{azul}$ lower than 95%, preferably lower than 92%; calculated as the average transmission value in the range 410-460 nm according to the following formula:

$$T_{azul} = \sum_{\lambda \in B} \frac{T(\lambda)}{6} \text{ where } B = \{410, 420, 430, 440, 450, 460\}$$

In fact, an additional advantage is that a suitable definition of each of the layers in the multiple layer structures also allows fulfilling an additional result, which is that the (little) visible light reflected is concentrated in the blue-violet spectrum. This way the lens offers additional protection to the user, reducing the amount of blue light that reaches the user's eye.

Preferably the coating includes a layer of anti-scratching lacquer between the multiple layer structure and the base.

Advantageously the lens has a multiple layer structure both on the inner surface and on the outer surface of the lens. In fact, this way it is possible to noticeably increase the effect of the IRA radiation filtered, with an improvement also in the transmittance in visible light.

Preferably the first high refraction index layer and/or the third high refraction index layer have a refraction index $n_D$ higher than 1.95.

Preferably the second low refraction index layer has a refraction index $n_D$ lower than 1.5.

Advantageously the fourth layer has a refraction index $n_D$ lower than 1.65.

Preferably the fourth layer has a refraction index $n_D$ between 1.4 and 1.6 and a thickness between 50 and 124 nm.

Advantageously the first intermediate layer has a thickness between 0 and 25 nm.

Advantageously the first high refraction index layer and/or the third high refraction index layer is made up of two high refraction index sub-layers, preferably by a first sub-layer of $TiO_2$ and a second sub-layer of $ZrO_2$ or vice versa. In fact, the $ZrO_2$ has a high evaporation temperature and, as a layer of considerable thickness, can cause cracking problems due to residual stress. An alternative would be to completely replace this layer of $ZrO_2$ with a layer of $TiO_2$, which has a lower evaporation temperature. However, this layer of $TiO_2$ is less hard, therefore is scratches more easily. The solution proposed allows combining the advantages in both cases. Generally, in this specification and claims it must be understood that, when a layer is defined by indicating that the materials can be "a mixture of the above", this includes not only the case where a layer includes a more or less homogenous mixture of said materials, but also the case where the layer is divided into sub-layers, each one of them made of one of said materials. The specific case of the two sub-layers of $TiO_2$ and $ZrO_2$ is an example of this. So, another advantageous solution example is when the second low refraction index layer and/or the fourth layer are made up of two low refraction index sub-layers, preferably by a first sub-layer of $SiO_2$ and a second sub-layer of $Al_2O_3$ or vice versa.

Advantageously on the fourth layer there is a hydrophobic outer layer.

The lenses can be both sun lenses (absorbent in the visible spectrum) and substantially transparent lenses in the visible spectrum (indoor lenses).

The application of these layers is usually done using PVD (Physical Vapor Deposition) techniques through evaporation with electron guns or thermal evaporation, although other techniques exist like Plasma enhanced Chemical Vapor Deposition (PeCVD) or the reactive Sputtering with which it is also possible to obtain this type of interferential layers.

A particularly advantageous embodiment of the invention is obtained when the multiple layer structure includes:

an interphase with a thickness between 15 and 45 nm, preferably of $SiO_2$, a first high refraction index layer with a thickness between 123 and 145 nm, preferably of $TiO_2$, a second low refraction index layer with a thickness between 170 and 217 nm, preferably of $SiO_2$, a third high refraction index layer, divided into a first sub-layer with a thickness between 59 and 67 nm, preferably of $TiO_2$, and a second sub-layer with a thickness between 50 and 74 nm, preferably of $ZrO_2$, a fourth layer with a thickness between 44 and 68 nm, preferably of $SiO_2$.

BRIEF DESCRIPTION OF THE DRAWINGS

Other advantages and characteristics of the invention are appreciated from the following description, where, in a non-limiting manner, some preferable embodiments of the invention are explained, with reference to the accompanying drawings. The figures show.

DETAILED DESCRIPTION

Figure 1:
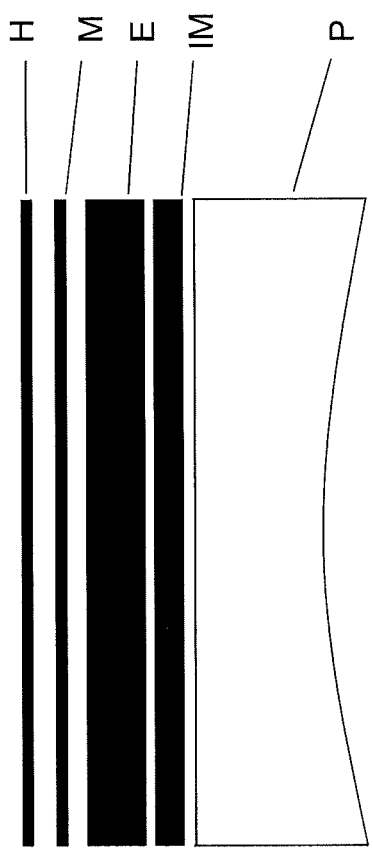
FIG. 1, a diagrammatic view of a cross section of an embodiment of a lens with a coating according to the invention.

FIG. 1 shows a general structure example of a lens according to the invention. The lens includes a base P of polymeric material on which there is a primer layer IM, which is optional and which usually has a thickness between 0.3 and 1.5 microns. Next there is a hardening layer E (usually with a thickness between 1 and 4 microns) on which the multiple layer structure M according to the invention is arranged. This multiple layer structure M is made up of a plurality of layers, which will be detailed later. The last layer of the structure is a hydrophobic layer H, with a thickness between 3 and 25 nm. Generally this structure can exist on the two lens surfaces or only on one of them. If present on one of them, any other conventional coating can be applied to the opposite surface.

Figure 2:
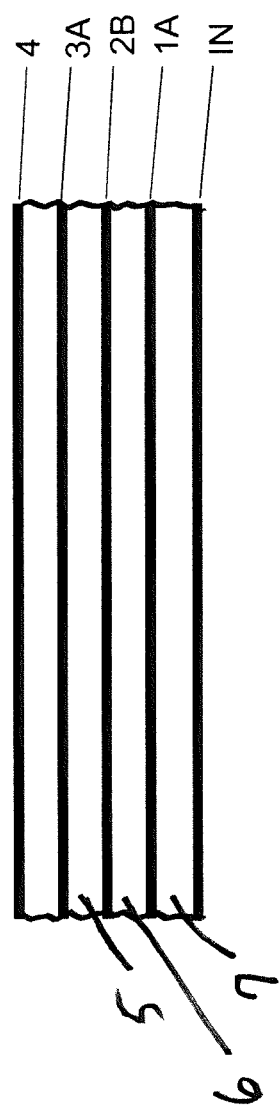
FIG. 2, a diagrammatic view of a cross section of a multiple layer structure according to the invention.

FIG. 2 shows diagrammatically a multiple layer structure M according to the invention in greater detail.

The multiple layer structure M includes an interphase IN (which is optional) of metallic material or metallic oxide, with scarce repercussion in the optical properties but critical for the mechanical properties, particularly those regarding adherence and wear, and a barrier against oxidation and diffusion. Preferably the material is one of the group made up of $SiO_x$, $SiO_2$, Cr, Ni/Cr, $SnO_2$, $Al_2O_3$, AlN, ZnO, SiO/Cr, $SiO_x/Al_2O_3$, ITO and $MoO_3$.

Next there is a first high refraction index layer 1A of metallic oxide, metallic nitride or metallic oxynitride with a refraction index $n_D>1.8$ (preferably >1.95) necessary for adjusting the optical properties and essential for obtaining mechanical properties resistant to scratching. It is the first high refraction index layer 1A. Preferably it is made of a material from the group made up of oxides, nitrides or oxynitrides of Zr, Ti, Sb, In, Sn, Ta, Nb, Hf and mixtures thereof.

The following layer is made of a metallic oxide or fluoride with a refraction index $n_D<1.65$ (preferably <1.5) necessary for adjusting the optical properties and essential for obtaining the mechanical properties resistant to scratching. It forms the second low refraction index layer 2B. Preferably it is made of a material from the group made up of $SiO_2$, $MgF_2$, $Al_2O_3$, $LaF_3$ and mixtures thereof.

On the second low refraction index layer 2B there is a third high refraction index layer 3A, made of metallic oxide, metallic nitride or metallic oxynitride with a refraction index $n_D>1.8$ (preferably >1.95). Preferably it is made of a material from the group made up of oxides, nitrides or oxynitrides of Zr, Ti, Sb, In, Sn, Ta, Nb, Hf and mixtures thereof.

On the third high refraction layer 3A there is a layer of metallic oxide or fluoride with a refraction index $n_D<1.8$ (preferably <1.65). It is the fourth layer 4. Preferably it is made of a material from the group made up of $SiO_2$, $MgF_2$, $Al_2O_3$, $LaF_3$ and mixtures thereof.

The total thickness of the multiple layer structure is less than 600 nm, measured from the start of the interphase to the end of the fourth layer, and preferably it is less than 500 nm.

The simulation of the reflection and transmission curves of the multiple layers is achieved using the transfer matrix method, introduced by F. Abelès (F. Abelès, J. Phys. Radium 11, 307 (1950)) and described in the state of the art (for example in H. A. Macleod, Thin-Film Optical Filters, 4$^{th}$ Edition, CRC Press (2010)). It is the method applied by most of the commercial programs (see, for example, FilmStar™ (www.ftgsoftware.com) or Essential Macleod (www.thinfilmcenter.com)) on the simulation of the reflection of multiple layers, and it is used knowing the dispersion of the complex refraction indices of the materials in each layer and the substrate, in the range of 380-1400 nm, the thicknesses of each layer and the incidence angle of the light radiation.

Methods of analyzing a lens with a coating according to the invention

The analyses required to analyze a lens according to the invention can be, for example:

Optical properties: optical transmittance and reflection spectra from 200 to 3000 nm. The reference standard will be EN1836

Layer thickness and composition: ESCA (Electron Spectroscopy for Chemical Analysis), XPS (X-ray Photoelectron Spectroscopy), Electron Microscopy, SIMS (Secondary Ion Mass Spectroscopy).

EXAMPLES

Below are shown a series of examples wherein, in each case, the composition and thickness of the layer is indicated and the optical properties obtained.

Example 1: Minimizing the Reflection of Visible Radiation

| | |
|---|---|
| Layer 4 | $SiO_2$-81.2 nm |
| Layer 3A | TiO2-101.8 nm |
| Layer 2B | SiO2-169.9 nm |
| Layer1A | TiO2-120.8 nm |
| Base | Polymer $n_D$ = 1.6 |
| RV 15° | 0.5% |
| RV 60° | 5.0% |
| T IR-A | 71.8% |
| Total thickness | 437.7 nm |

Figure 3:
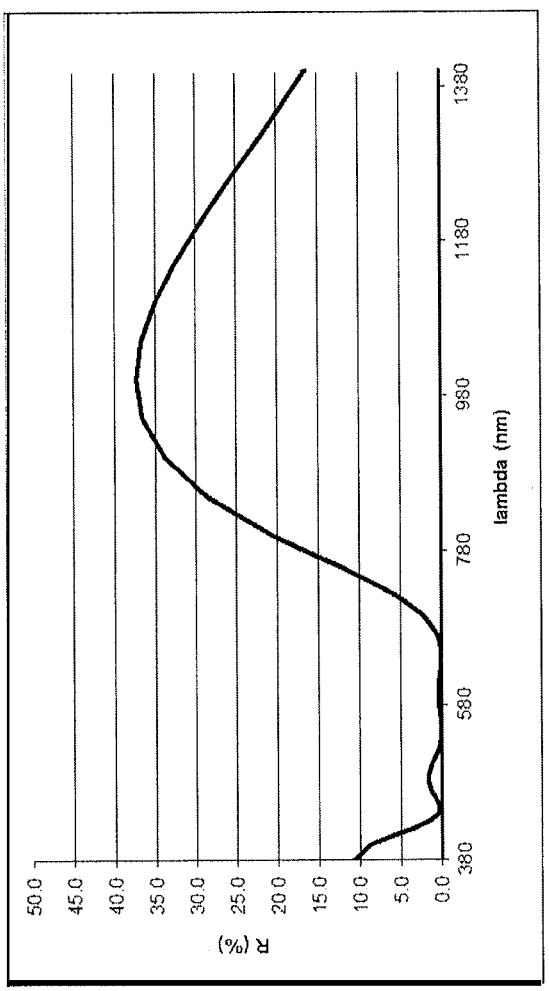
FIGS. 3 to 15, graph showing the reflection (in %) according to the wave length ($\lambda$, in nm) of the incident radiation for the lenses in the respective examples.

FIG. 3 shows a graph showing the reflection (in %) according to the wave length (λ, in nm) of the incident radiation.

Example 2: Minimizing the Transmission of IR-A Radiation

| | |
|---|---|
| Layer 4 | $SiO_2$-61.4 nm |
| Layer 3A | $TiO_2$-107.6 nm |
| Layer 2B | $SiO_2$-169.0 nm |
| Layer 1A | $TiO_2$-126.0 nm |
| Base | Polymer $n_D$ = 1.6 |
| RV 15° | 1.5% |
| RV 60° | 5.0% |
| T IR-A | 69.7% |
| Total thickness | 463.9 nm |

Figure 4:
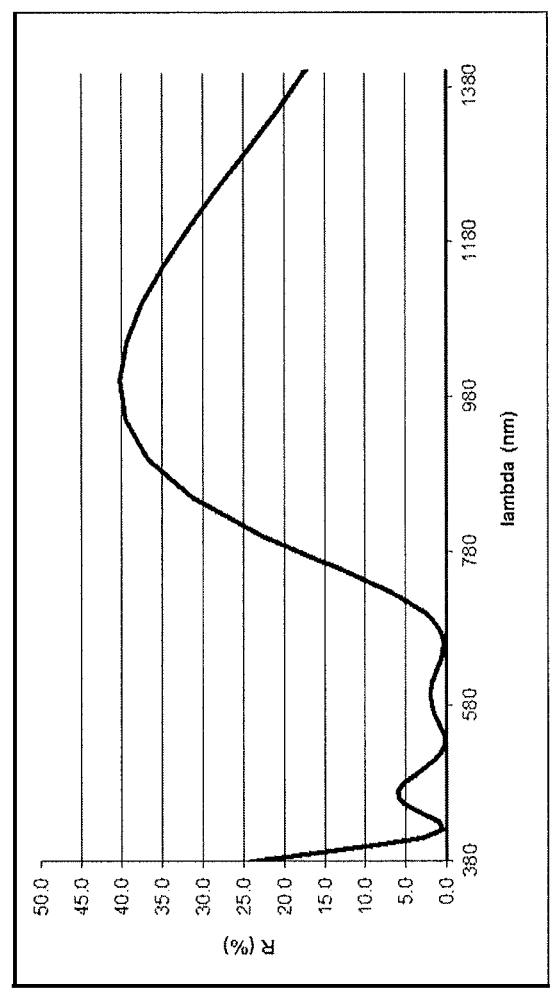

FIG. 4 shows a graph showing the reflection (in %) according to the wave length (λ, in nm) of the incident radiation.

Example 3: Minimizing the Reflection of Radiation at 60°

| | |
|---|---|
| Layer 4 | $SiO_2$-98.0 nm |
| Layer 3A | TiO2-117.7 nm |
| Layer 2B | SiO2-202.3 nm |
| Layer 1A | TiO2-129.9 nm |
| Base | Polymer $n_D$ = 1.6 |
| RV 15° | 1.5% |
| RV 60° | 3.0% |
| T IR-A | 75.3% |
| Total thickness | 547.8 nm |

Figure 5:
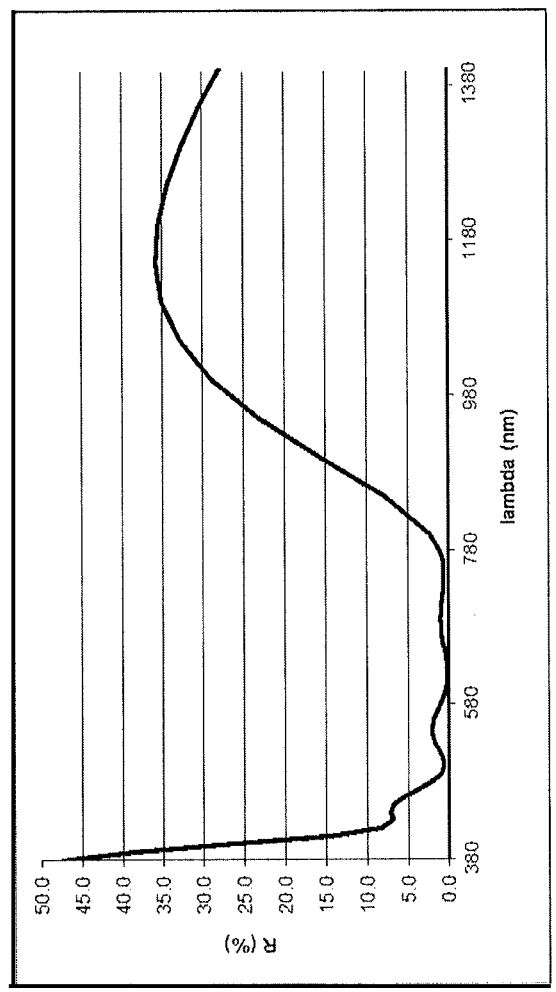

FIG. 5 shows a graph showing the reflection (in %) according to the wave length (λ, in nm) of the incident radiation.

Example 4: Minimizing the Transmission of Blue Light

| Layer 4 | SiO$_2$-70.6 nm |
|---|---|
| Layer 3A | TiO$_2$-121.7 nm |
| Layer 2B | SiO$_2$-226.0 nm |
| Layer 1A | TiO$_2$-140.1 nm |
| Base | Polymer n$_D$ = 1.6 |
| RV 15° | 1.5% |
| RV 60° | 4.4% |
| T IR-A | 74.3% |
| Total thickness | 558.2 nm |

Figure 6:
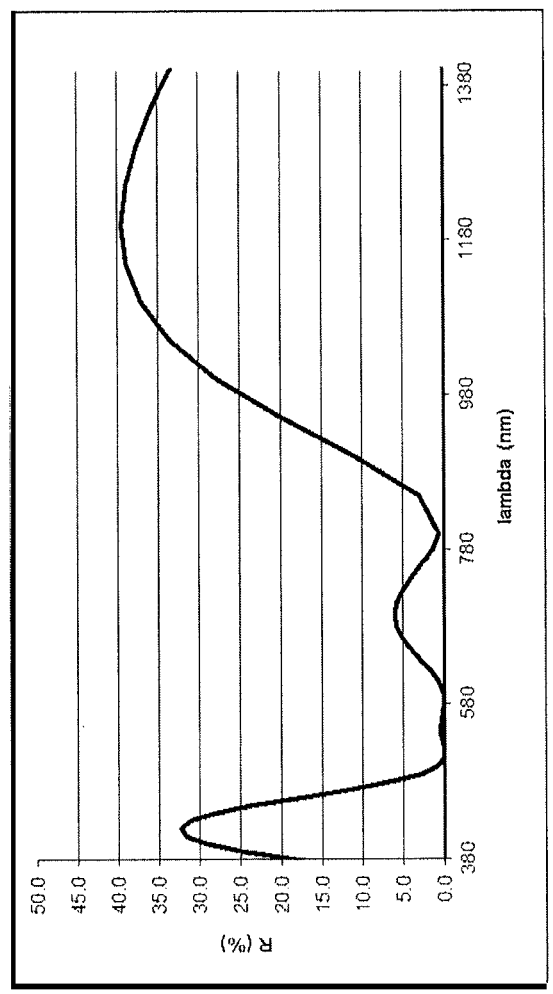

FIG. 6 shows a graph showing the reflection (in %) according to the wave length (λ, in nm) of the incident radiation.

A 70.6% transmission of blue light is obtained.

Example 5: Minimizing the Reflection of Visible Radiation

In this Example other materials have been used to produce the layers in the multiple layer structure.

| Layer 4 | MgF$_2$-77.1 nm |
|---|---|
| Layer 3A | ZrO$_2$-115.8 nm |
| Layer 2B | MgF$_2$-189.7 nm |
| Layer 1A | ZrO$_2$-141.0 nm |
| Base | Polymer n$_D$ = 1.6 |
| RV 15° | 0.4% |
| RV 60° | 5.0% |
| T IR-A | 76.0% |
| Total thickness | 523.7 nm |

Figure 7:
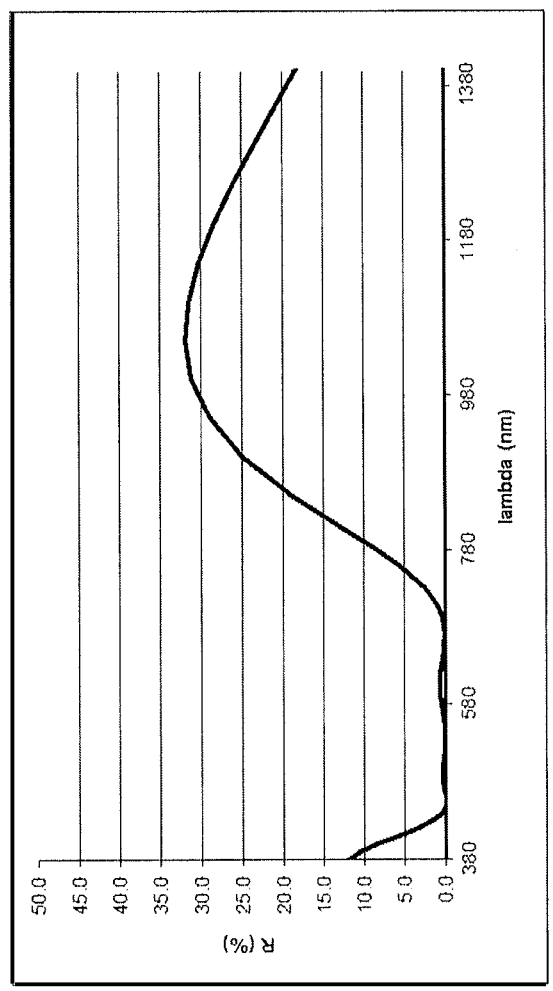

FIG. 7 shows a graph showing the reflection (in %) according to the wave length (λ, in nm) of the incident radiation.

Example 6: Residual Reflection Concentrated in Green

| Layer 4 | SiO$_2$-100.9 nm |
|---|---|
| Layer 3A | TiO$_2$-118.5 nm |
| Layer 2B | SiO$_2$-188.3 nm |
| Layer 1A | TiO$_2$-116.9 nm |
| Base | Polymer n$_D$ = 1.6 |
| RV 15° | 1.5% |
| RV 60° | 3.8% |
| T IR-A | 75.0% |
| Total thickness | 524.6 nm |

Figure 8:
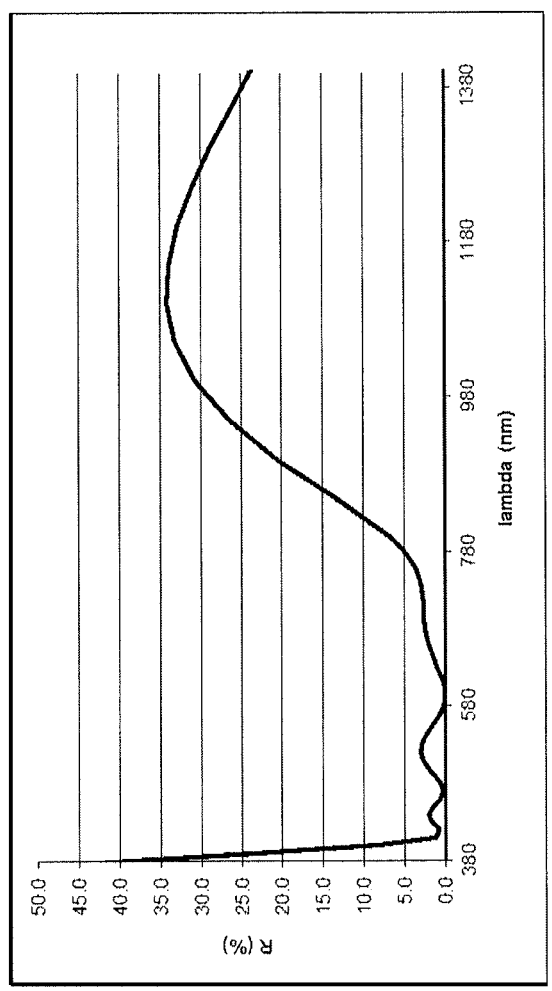

FIG. 8 shows a graph showing the reflection (in %) according to the wave length (λ, in nm) of the incident radiation.

Example 7: Solution According to the State of the Art

In this Example the solution that would have been obtained from the knowledge of the state of the art has been reproduced.

| Layer 6 | SiO$_2$-73.0 nm |
|---|---|
| Layer 5 | TiO$_2$-103.3 nm |
| Layer 4 | SiO$_2$-158.6 nm |
| Layer 3 | TiO$_2$-100.1 nm |
| Layer 2 | SiO$_2$-169.2 nm |
| Layer 1 | TiO$_2$-113.2 nm |
| Base | Polymer n$_D$ =1.6 |
| RV 15° | 1.2% |
| RV 60° | 6.2% |
| T IR-A | 67.1% |
| Total thickness | 717.4 nm |

As you can see, more layers are used and the thickness is greater than 600 nm.

Figure 9:
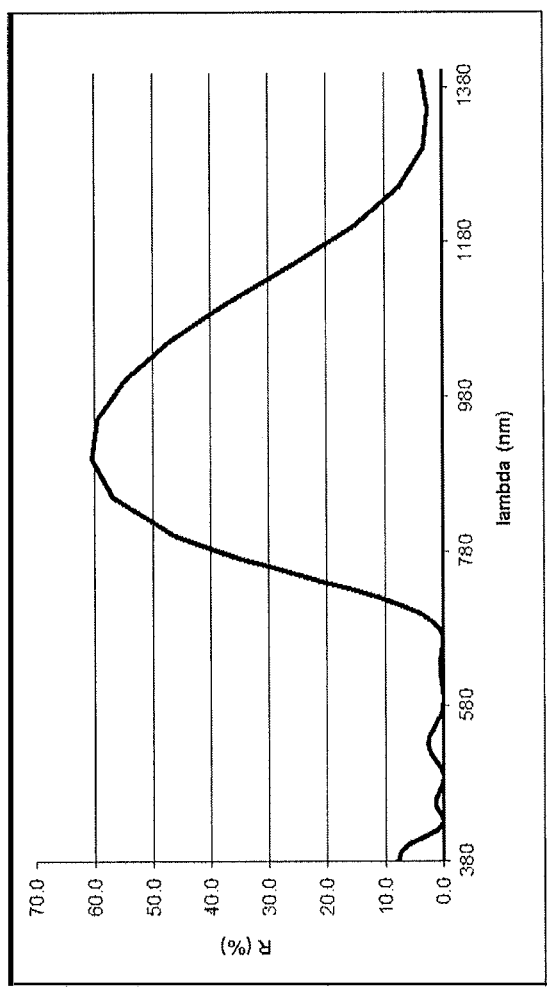

FIG. 9 shows a graph showing the reflection (in %) according to the wave length (λ, in nm) of the incident radiation.

Example 8

This Example shows how, starting with a first multiple layer structure (#8a), it is possible to improve the optical properties by including an intermediate layer 5 between the second low refraction index layer and the third high refraction index layer (#8b). It also shows another multiple layer structure (#8c) which, without the presence of the intermediate layer 5, has practically the same optical properties. The structure #8c fulfils an equivalence relation between the physical thicknesses and the optical thicknesses of the central triplet in the structure #8b (intermediate layer of Al$_2$O$_3$ and its two adjacent layers) and the doublet in the structure #8c (the second low refraction index layer (SiO$_2$) and the third high refraction index layer (TiO$_2$)).

|  | #8a | #8b | #8c |
|---|---|---|---|
| SiO$_2$ | 84.4 nm | 84.4 nm | 84.4 nm |
| TiO$_2$ | 90.0 nm | 90.0 nm | 98.4 nm |
| Al$_2$O$_3$ | 0.0 nm | 34.8 nm | 0.0 nm |
| SiO$_2$ | 142.6 nm | 142.6 nm | 174.2 nm |
| TiO$_2$ | 122.5 nm | 122.5 nm | 122.5 nm |
| Base | Polymer n$_D$ = 1.6 | Polymer n$_D$ = 1.6 | Polymer n$_D$ = 1.6 |
| RV 15° | 1.8% | 0.4% | 0.5% |
| RV 60° | 11.0% | 4.8% | 5.0% |
| T IR-A | 74.7% | 72.9% | 72.1% |
| Total thickness | 439.6 nm | 474.4 nm | 479.5 nm |
| Thickness of the central triplet | 232.6 nm | 267.5 nm | 272.6 nm |
| Optical thickness of the central triplet | 388.4 nm | 445.4 nm | 450.6 nm |

Figure 10:
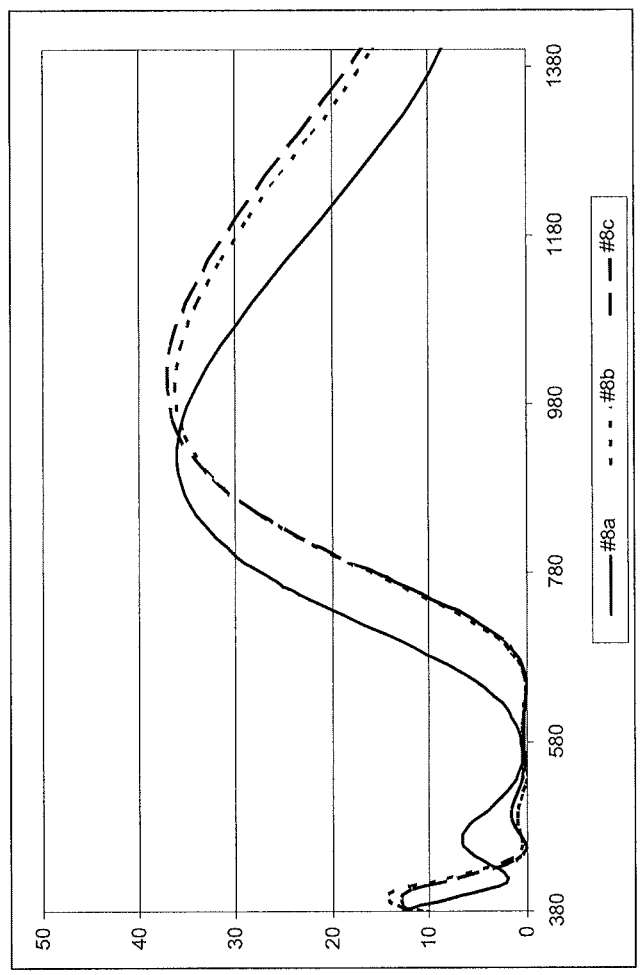

FIG. 10 shows a graph showing the reflection (in %) according to the wave length (λ, in nm) of the incident radiation for each of the three cases.

Example 9

In this Example, as in Example 8, it shows how, starting with a first multiple layer structure (#9a), it is possible to improve the optical properties by including an intermediate layer. In this case it is an intermediate layer 6 between the first high refraction index layer and the second low refraction index layer (#9b). It also shows another multiple layer structure (#9c) which, without the presence of the intermediate layer 6, has virtually the same optical properties. Also in this case the structure #9c fulfils an equivalence relation between the physical thicknesses and the optical thicknesses of the central triplet in the structure #9b (intermediate layer of $Al_2O_3$ and its two adjacent layers) and the doublet in the structure #9c (the first high refraction index layer ($TiO_2$) and the second low refraction index layer ($SiO_2$)).

|  | #9a | #9b | #9c |
|---|---|---|---|
| $SiO_2$ | 87.7 nm | 87.7 nm | 87.7 nm |
| $TiO_2$ | 110.8 nm | 110.8 nm | 110.8 nm |
| $SiO_2$ | 148.3 nm | 148.3 nm | 175.9 nm |
| $Al_2O_3$ | 0.0 nm | 33.9 nm | 0.0 nm |
| $TiO_2$ | 104.0 nm | 104.0 nm | 109.7 nm |
| Base | Polymer | Polymer | Polymer |
|  | $n_D = 1.6$ | $n_D = 1.6$ | $n_D = 1.6$ |
| RV 15° | 2.9% | 1.0% | 1.1% |
| RV 60° | 9.7% | 4.5% | 5.0% |
| T IR-A | 74.5% | 73.5% | 73.0% |
| Total thickness | 450.9 nm | 484.8 nm | 484.1 nm |
| Thickness of the triplet in contact with the base | 252.3 nm | 286.3 nm | 285.6 nm |
| Optical thickness of the triplet in contact with the base | 424.9 nm | 480.4 nm | 476.2 nm |

Figure 11:
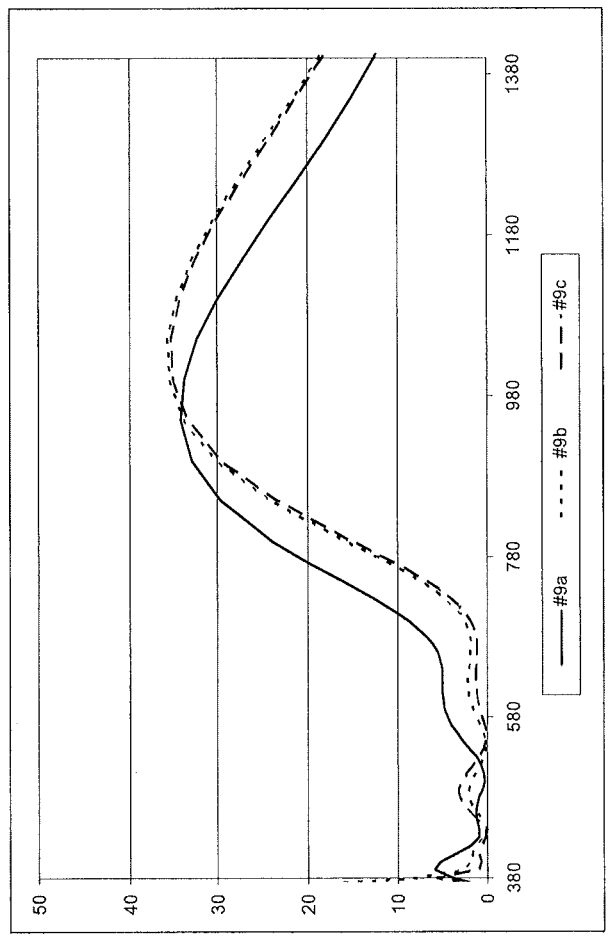

FIG. 11 shows a graph showing the reflection (in %) according to the wave length (λ, in nm) of the incident radiation for each of the three cases.

Example 10

In this Example, the multiple layer structure has an interphase (of $SiO_2$ and 15 nm thick), and the third high refraction index layer is sub-divided into two sub-layers (one of $TiO_2$ and one of $ZrO_2$).

| Layer 4 | $SiO_2$-62.4 nm |
|---|---|
| Layer 3A-2 | $ZrO_2$-50.0 nm |
| Layer 3A-1 | $TiO_2$-59.3 nm |
| Layer 2B | $SiO_2$-175.7 nm |
| Layer 1A | $TiO_2$-126.5 nm |
| Interphase | $SiO_2$-15 nm |
| Base | Polymer $n_D = 1.6$ |
| RV 15° | 0.9% |
| RV 60° | 4.7% |
| T IR-A | 72.0% |
| Total thickness | 488.9 nm |

This solution is a preferable embodiment of the invention.

Figure 12:
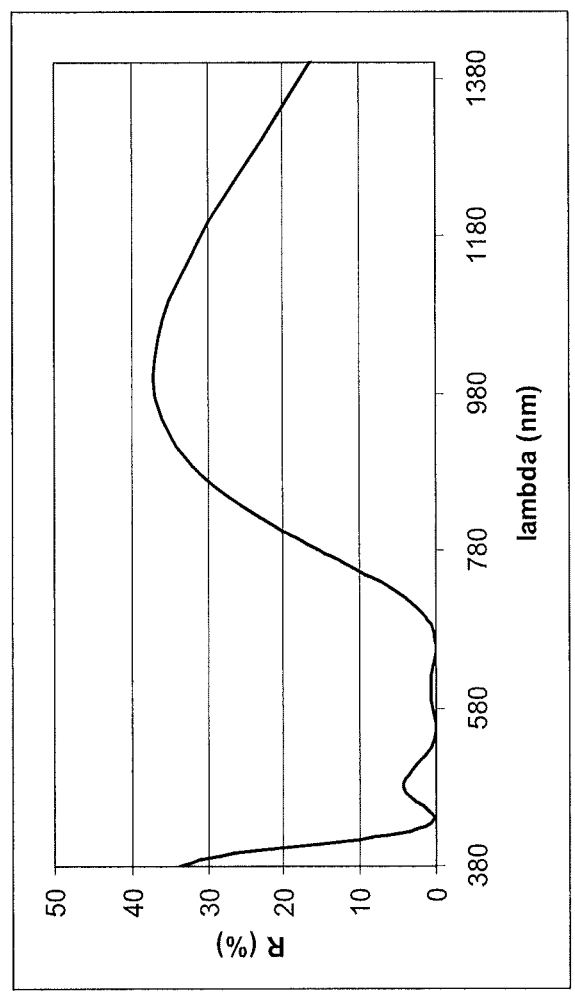

FIG. 12 shows a graph showing the reflection (in %) according to the wave length (λ, in nm) of the incident radiation.

Examples 11 and 12

In these Examples, as in Examples 8 and 9, it shows how, starting with a first multiple layer structure (#11a, #12a), it is possible to improve the optical properties by including an intermediate layer (an intermediate layer 5 in Example 11 and an intermediate layer 6 in Example 12). They are the structures #11b and #12b, respectively. They also show other multiple layer structures (#11c, #12c) which, without the presence of the intermediate layer 6, has virtually the same optical properties. Also in these cases the structures #11c and #12c fulfil an equivalence relation between the physical thicknesses and the optical thicknesses of the triplet in the structures #11b and #12b and the corresponding doublets in structures #11c and #12c.

|  | #11a | #11b | #11c |
|---|---|---|---|
| $SiO_2$ | 85.0 nm | 85.0 nm | 85.0 nm |
| $TiO_2$ | 95.9 nm | 95.9 nm | 102.0 nm |
| $Al_2O_3$ | 0.0 nm | 40.7 nm | 0.0 nm |
| $SiO_2$ | 127.0 nm | 127.0 nm | 170.7 nm |
| $TiO_2$ | 124.3 nm | 124.3 nm | 124.3 nm |
| Base | Polymer | Polymer | Polymer |
|  | $n_D = 1.6$ | $n_D = 1.6$ | $n_D = 1.6$ |
| RV 15° | 3.0% | 0.7% | 0.6% |
| RV 60° | 11.3% | 4.5% | 4.8% |
| T IR-A | 76.0% | 73.6% | 72.2% |
| Total thickness | 432.2 nm | 472.9 nm | 481.9 nm |
| Thickness of the central triplet | 222.9 nm | 263.6 nm | 272.6 nm |
| Optical thickness of the central triplet | 377.7 nm | 444.3 nm | 452.9 nm |

Figure 13:
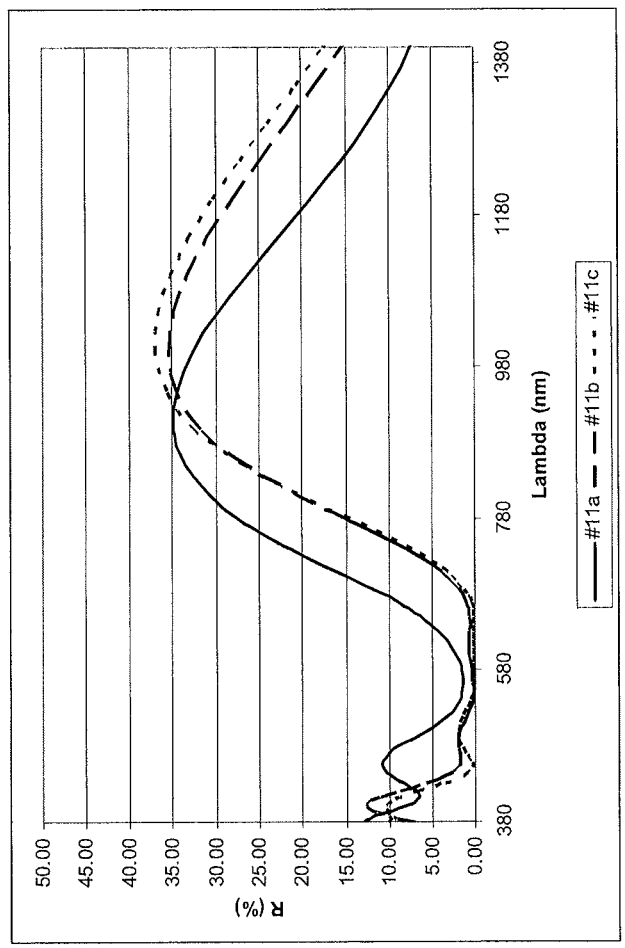

FIG. 13 shows a graph showing the reflection (in %) according to the wave length (λ, in nm) of the incident radiation for each one of the three cases in Example 11.

|  | #12a | #12b | #12c |
|---|---|---|---|
| $SiO_2$ | 78.5 nm | 78.5 nm | 78.5 nm |
| $TiO_2$ | 112.1 nm | 112.1 nm | 112.1 nm |
| $SiO_2$ | 127.0 nm | 127.0 nm | 160.4 nm |
| $Al_2O_3$ | 0.0 nm | 41.2 nm | 0.0 nm |
| $TiO_2$ | 111.3 nm | 111.3 nm | 122.1 nm |
| Base | Polymer | Polymer | Polymer |
|  | $n_D = 1.6$ | $n_D = 1.6$ | $n_D = 1.6$ |
| RV 15° | 3.7% | 1.0% | 1.1% |
| RV 60° | 10.0% | 4.5% | 4.7% |
| T IR-A | 75.1% | 72.9% | 71.8% |
| Total thickness | 428.9 nm | 470.1 nm | 473.1 nm |
| Thickness of the triplet in contact with the base | 238.3 nm | 279.4 nm | 282.4 nm |
| Optical thickness of the triplet in contact with the base | 409.0 nm | 476.5 nm | 478.9 nm |

Figure 14:
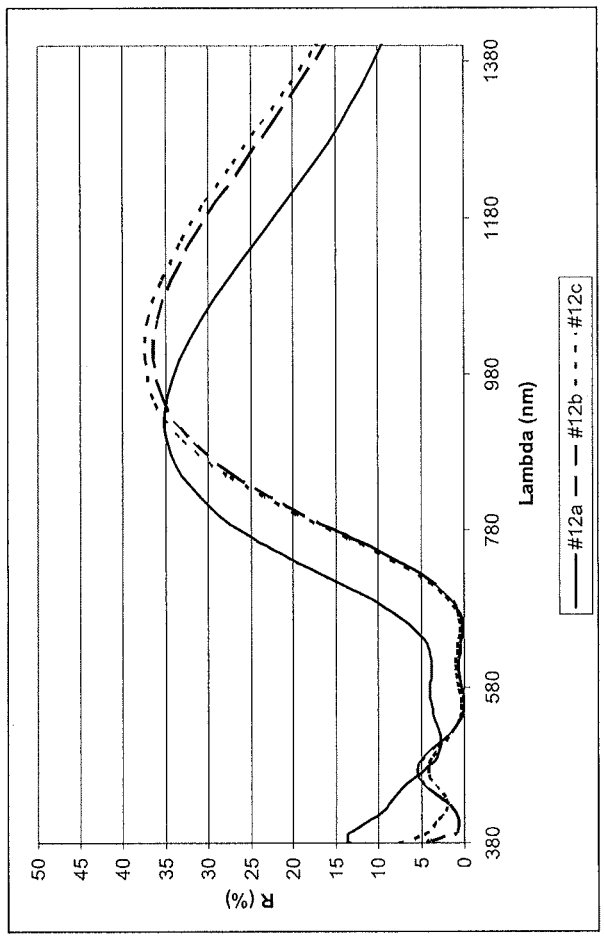

FIG. 14 shows a graph showing the reflection (in %) according to the wave length (λ, in nm) of the incident radiation for each one of the three cases in Example 12.

Example 13: Triplet and Doublet High Index Refraction Layers, without Interphase and with Residual Reflex Concentrated in the Green Color The interphase between the base and the first high refraction index layer has a thickness of 0 nm, i.e., there is no interphase layer The first high refraction index layer is a triplet formed by 41.8 nm $ZrO_2$+92.7 nm $TiO_2$+28.8 nm $ZrO_2$ (total 162.9 nm), in this order, starting from the base The second low refraction index layer is formed by 153.4 nm of $SiO_2$ The third high refraction index layer is a doublet formed by 15.0 nm $ZrO_2$+105.1 nm $TiO_2$ The fourth layer is formed by 78.8 nm of $SiO_2$.

The base has a refraction index of 1.6

| Layer 4 | $SiO_2$-78.8 nm |
|---|---|
| Layer 3A-2 | $TiO_2$-105.1 nm |
| Layer 3A-1 | $ZrO_2$-15.0 nm |
| Layer 2B | $SiO_2$-153.4 nm |

-continued

| | |
|---|---|
| Layer 1A-3 | $ZrO_2$-28.4 nm |
| Layer 1A-2 | $TiO_2$-92.7 nm |
| Layer 1A-1 | $ZrO_2$-41.8 nm |
| Base | Polymer $n_D$ = 1.6 |
| RV 15° | 0.8% |
| RV 60° | 4.6% |
| T IR-A | 63.6% |
| Total Thickness | 515.1 nm |

Figure 15:
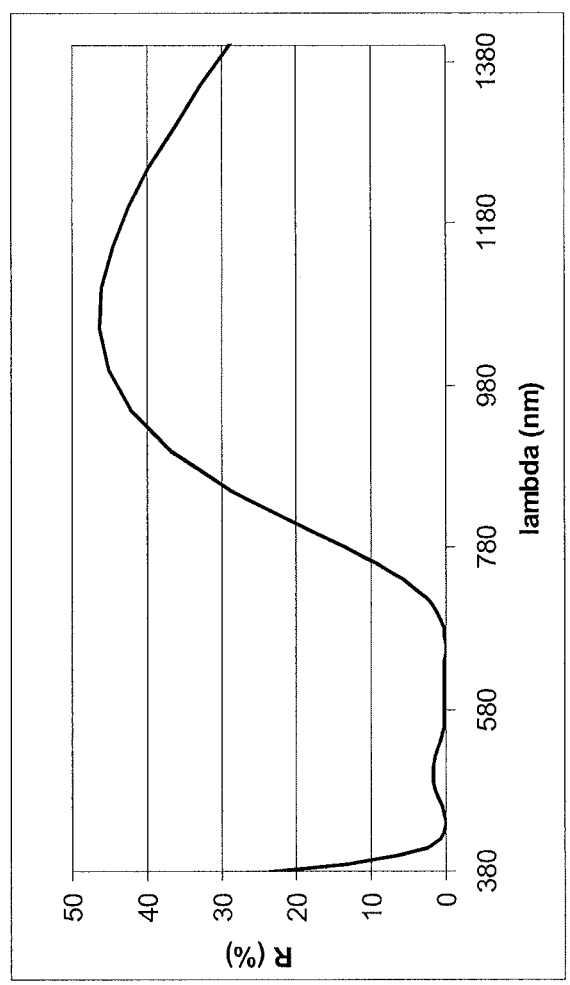

FIG. 15 shows a graph showing the reflection (in %) according to the wave length ($\lambda$, in nm) of the incident radiation.

The invention claimed is:

1. An ophthalmic lens having a base of polymeric material with a coating having an interferential multiple layer structure, said multiple layer structure comprising:
an interphase, orientated towards the base and selected from the group consisting of $SiO_x$, $SiO_2$, Cr, Ni/Cr, $SnO_2$, $Al_2O_3$, AlN, ZnO, SiO/Cr, $SiO_x/Al_2O_3$, ITO, and $MoO_3$, with a thickness between 0 and 150 nm,
a first high refraction index layer selected from the group consisting of oxides, nitrides and oxynitrides of Zr, Ti, Sb, In, Sn, Ta, Nb, Hf and mixtures thereof, with a refraction index $n_D$ higher than 1.8,
a second low refraction index layer selected from the group consisting of $SiO_2$, $MgF_2$, $Al_2O_3$, $LaF_3$ and mixtures thereof, with a refraction index $n_D$ lower than 1.65,
a third high refraction index layer selected from the group consisting of oxides, nitrides and oxynitrides of Zr, Ti, Sb, In, Sn, Ta, Nb, Hf and mixtures thereof, with a refraction index $n_D$ higher than 1.8,
a fourth layer selected from the group consisting of $SiO_2$, $MgF_2$, $Al_2O_3$, $LaF_3$ and mixtures thereof, with a refraction index $n_D$ lower than 1.8,
wherein a total thickness of said multiple layer structure is at most 600 nm, measured from an outer surface of the interphase to an outer surface of the fourth layer, and
wherein, a thickness of said first high refraction index layer is between 91 and 169 nm, a thickness of said second low refraction index layer is between 128 and 248 nm, a thickness of said third high refraction index layer is between 73 and 159 nm, and a thickness of said fourth layer is between 40 and 138 nm.

2. The ophthalmic lens according to claim 1, wherein the thickness x of said first high refraction index layer, the thickness y of said second low refraction index layer, the thickness z of said third high refraction index layer and the thickness t of said fourth layer fulfil the following relation:

$$(x\ y\ z\ t) - (129.5\ 188.3\ 116.0\ 89.0) \cdot A \cdot \begin{pmatrix} x - 129.5 \\ y - 188.3 \\ z - 116.0 \\ t - 89.0 \end{pmatrix} \leq 1 \text{ where}$$

$$A = \begin{pmatrix} 8.29 \cdot 10^4 & -1.76 \cdot 10^{-4} & -1.18 \cdot 10^{-4} & 1.50 \cdot 10^{-4} \\ -1.76 \cdot 10^{-4} & 3.34 \cdot 10^{-4} & -1.80 \cdot 10^{-5} & -3.50 \cdot 10^{-5} \\ -1.18 \cdot 10^{-4} & -1.80 \cdot 10^{-5} & 7.16 \cdot 10^{-4} & -2.60 \cdot 10^{-4} \\ 1.50 \cdot 10^{-4} & -3.50 \cdot 10^{-5} & -2.60 \cdot 10^{-4} & 5.34 \cdot 10^{-4} \end{pmatrix}.$$

3. The ophthalmic lens according to claim 1, wherein a simulation of reflection and transmission curies of said multiple layer structure has the following characteristics:
a visible reflection $R_{vis}$ by a light incidence angle of 15° lower than 2.5%, calculated as an average of a reflection value in a range of 300-780 nm, weighted by an efficiency spectrum of spectral light for day light and by a spectral distribution of the illuminant D65, according to Spanish standard UNI-EN ISO 13666:1998,
a visible reflection $R_{vis}$ by a light incidence angle of 60° lower than 5.0%, calculated as an average of a reflection value in a range of 380-780 nm, weighted by an efficiency spectrum of spectral light for day light and by a spectral distribution of the illuminant D65, according to Spanish standard UNI-EN ISO 13666:1998, and
a transmission value in the infra-red A $T_{IR-A}$ lower than 76%, calculated as an average transmission value in a range of 780-1400 nm according to the following formula:

$$T_{IR-A} = \sum_{\lambda \in A} \frac{T(\lambda)}{14} \text{ where } A = \{780, 800, 850, 900, 950,$$

$$1000, 1050, 1100, 1150, 1200, 1250, 1300, 1350, 1400\}.$$

4. The ophthalmic lens according to claim 1, wherein:
the interphase has a thickness between 15 and 45 nm,
the first high refract on index layer thickness is between 123 and 145 nm,
the second low refraction index layer thickness is between 170 and 217 nm,
the third high refraction index layer is divided into a first sub-layer with a thickness between 59 and 67 nm, and a second sub-layer with a thickness between 50 and 74 nm, and
the fourth layer thickness is between 44 and 68 nm.

5. The ophthalmic lens according to claim 1, wherein, the thickness x of said first high refraction index layer, the thickness y of said second low refraction layer, the thickness z of said third high refraction index layer and the thickness t of said fourth layer fulfil the following relation:

$$(x\ y\ z\ t) - (129.7\ 189.7\ 114.2\ 87.2) \cdot A \cdot \begin{pmatrix} x - 129.7 \\ y - 189.7 \\ z - 114.2 \\ t - 87.2 \end{pmatrix} \leq 1$$

where $$A = \begin{pmatrix} 1.53 \cdot 10^{-3} & -3.41 \cdot 10^{-4} & -1.35 \cdot 10^{-4} & 8.99 \cdot 10^{-5} \\ -3.41 \cdot 10^{-4} & 4.82^{-4} & -1.86 \cdot 10^{-5} & 9.77 \cdot 10^{-6} \\ -1.35 \cdot 10^{-4} & -1.86 \cdot 10^{-5} & 1.12 \cdot 10^{-3} & -2.53 \cdot 10^{-4} \\ 8.99 \cdot 10^{-5} & 9.77 \cdot 10^{-6} & -2.53 \cdot 10^{-4} & 8.44 \cdot 10^{-4} \end{pmatrix}.$$

6. An ophthalmic lens having a base of polymeric material with a coating having an interferential multiple layer structure, said multiple layer structure comprising:
an interphase, orientated towards the base and selected from the group consisting of $SiO_x$, $SiO_2$, Cr, Ni/Cr, $SnO_2$, $Al_2O_3$, AlN, ZnO, SiO/Cr, $SiO_x/Al_2O_3$, ITO, and $MoO_3$, with a thickness between 0 and 150 nm,
first high refraction index layer selected from the group consisting of oxides, nitrides and oxynitrides of Zr, Ti, Sb, In, Sn, Ta, Nb, Hf and mixtures thereof, with a refraction index $n_D$ higher than 1.8, a second low refraction index layer selected from the group consisting of $SiO_2$, $MgF_2$, $Al_2O_3$, $LaF_3$ and mixtures thereof, with a refraction index $n_D$ lower than 1.65, a third high refraction index layer selected from the group consisting of oxides, nitrides are oxynitrides of Zr, Ti, Sb, In, Sn, Ta, Nb, Hf and mixtures thereof, with a refraction index $n_D$ higher than 1.8, a fourth layer selected from the group consisting of $SiO_2$, $MgF_2$, $Al_2O_3$, $LaF_3$ and mixtures thereof, with a refraction index $n_D$ lower than 1.8, wherein between the interphase and the first high refraction index layer there is a first intermediate layer with a refraction index $n_D$ lower than 1.8 and with a thickness between 0 and 160 nm, wherein a total thickness of said multiple layer structure is at most 600 nm, measured from an outer surface of the interphase to an outer surface of the fourth layer, and wherein a triplet made up of said first intermediate layer, said first high refraction index layer and said second low refraction index layer has a total thickness that differs from a total thickness of the first high refraction index layer and the second low refraction index layer by less than 5%, and a total optical thickness of said triplet differs from a total optical thickness of the first high refraction index layer and the second low refraction index layer by less than 5%.

7. The ophthalmic lens according to claim 6, wherein, between the first high refraction index layer and the second low refraction index layer, there is a second intermediate layer with a refraction index $n_D$ between 1.65 and 1.8 and with a thickness between 0 and 100 nm, and wherein a second triplet made up of said first high refraction index layer, said second intermediate layer and said second low refraction index layer has a total thickness that differs from a total thickness of the second low refraction index layer and the third high refraction index layer by less than 5%, and such that a total optical thickness of said second triplet differs from a total optical thickness of the second low refraction index layer and the third high refractive index layer by less than 5%.

8. The ophthalmic lens according to claim 6, wherein said first intermediate layer thickness is between 0 and 25 nm.

9. An ophthalmic lens having a base of polymeric material with a coating having an interferential multiple layer structure, said multiple layer stricture comprising:

an interphase, orientated towards the base and selected from the group consisting of $SiO_x$, $SiO_2$, Cr, Ni/Cr, $SnO_2$, $Al_2O_3$, AlN, ZnO, SiO/Cr, $SiO_x/Al_2O_3$, ITO, and $MoO_3$, with a thickness between 0 and 150 nm, a first high refraction index layer selected from the group consisting of oxides, nitrides and oxynitrides of Zr, Ti, Sb, In, Sn, Ta, Nb, Hf and mixtures thereof, with a refraction index $n_D$ higher than 1.8, a second low refraction index layer selected from the group consisting of $SiO_2$, $MgF_2$, $Al_2O_3$, $LaF_3$ and mixtures thereof, with a refraction index $n_D$ lower than 1.65, a third high refraction index layer selected from the group consisting of oxides, nitrides and oxynitrides of Zr, Ti, Sb, In, Sn, Ta, Nb, Hf and mixtures thereof, with a refraction index $n_D$ higher than 1.8, a fourth layer selected from the group consisting of $SiO_2$, $MgF_2$, $Al_2O_3$, $LaF_3$ and mixtures thereof, with a refraction index $n_D$ lower than 1.8, wherein between the first high refraction index layer and the second low refraction index layer there is a first intermediate layer with a refraction index $n_D$ between 1.65 and 1.8 and with a thickness between 0 and 100 nm, wherein a total thickness of said multiple layer structure is at most 600 nm, measured from an outer surface of the interphase to an outer surface of the fourth layer, and wherein a triplet made up of said first high refraction index layer, said first intermediate layer and said second low refraction index layer has a total thickness that differs from a total thickness of the first high refraction index layer and the second low refraction index layer by less than 5%, and a total optical thickness of said triplet differs from a total optical thickness of the first high refraction index layer and the second low refraction index layer by less than 5%.

10. An ophthalmic lens having a base of polymeric material with a coating having an interferential multiple layer structure, said multiple layer structure comprising:

an interphase, orientated towards the base and selected from the group consisting of $SiO_x$, $SiO_2$, Cr, Ni/Cr, $SnO_2$, $Al_2O_3$, AlN, ZnO, SiO/Cr, $SiO_x/Al_2O_3$, ITO, and $MoO_3$, with a thickness between 0 and 150 nm, a first high refraction index layer selected from the group consisting of oxides, nitrides and oxynitrides of Zr, Ti, Sb, In, Sn, Ta, Nb, Hf and mixtures thereof, with a refraction index $n_D$ higher than 1.8, a second low refraction index layer selected from the group consisting of $SiO_2$, $MgF_2$, $Al_2O_3$, $LaF_3$ and mixtures thereof, with a refraction index $n_D$ lower than 1.65, a third high refraction index layer selected from the group consisting of oxides, nitrides and oxynitrides of Zr, Ti, Sb, In, Sn, Ta, Nb, Hf and mixtures thereof, with a refraction index $n_D$ higher than 1.8, a fourth layer selected from the group consisting of $SiO_2$, $MgF_2$, $Al_2O_3$, $LaF_3$ and mixtures thereof, with a refraction index $n_D$ lower than 1.8, wherein between the second low refraction index layer and the third high refraction index layer there is a first intermediate layer with a refraction index $n_D$ between 1.65 and 1.8 and with a thickness between 0 and 110 nm, wherein a total thickness of said multiple layer structure is at most 600 nm, measured from an outer surface of the interphase to an outer surface of the fourth layer, and wherein a triplet made up of said second low refraction index layer, said first intermediate layer and said third high refraction index layer has a total thickness that differs from a total thickness of the second low refraction index layer and the third high refraction index layer by less than 5%, and a total optical thickness of said second triplet differs from a total optical thickness of the second low refraction index layer and the third high refractive index layer by less than 5%.

11. The ophthalmic lens according to claim 6, 9 or 10 wherein, between the second low refraction index layer and the third high refraction index layer, there is a second intermediate layer with a refraction index $n_D$ between 1.65 and 1.8 and with a thickness between 0 and 110 nm, and wherein a second triplet made up of said second low refraction index layer, said second intermediate layer and said third high refraction index layer has a total thickness that differs from a total thickness of the second low refraction index layer end the third high refraction index layer by less than 5%, and such that a total optical thickness of said second triplet differs from a total optical thickness of the second low refraction index layer and the third high refractive index layer by less than 5%.

12. The first ophthalmic lens according to any one of claims 6, 9 or 10, wherein, the thickness x of said first high refraction index layer, the thickness y of said second low refraction layer, the thickness z of said third high refraction index layer and the thickness t of said fourth layer fulfil the following relation:

$$(xyzt) - (129.7 \quad 189.7 \quad 114.2 \quad 87.2) \cdot A \cdot \begin{pmatrix} x - 129.7 \\ y - 189.7 \\ z - 114.2 \\ t - 87.2 \end{pmatrix} \leq 1 \text{ where}$$

$$A = \begin{pmatrix} 1.53 \cdot 10^{-3} & -3.41 \cdot 10^{-4} & -1.35 \cdot 10^{-4} & 8.99 \cdot 10^{-5} \\ -3.41 \cdot 10^{-4} & 4.82^{-4} & -1.86 \cdot 10^{-5} & 9.77 \cdot 10^{-6} \\ -1.35 \cdot 10^{-4} & -1.86 \cdot 10^{-5} & 1.12 \cdot 10^{-3} & -2.53 \cdot 10^{-4} \\ 8.99 \cdot 10^{-5} & 9.77 \cdot 10^{-6} & -2.53 \cdot 10^{-4} & 8.44 \cdot 10^{-4} \end{pmatrix}.$$

13. The ophthalmic lens according to any one of claims 1, 6, 9 or 10, wherein a simulation of reflection and transmission curves of said multiple layer structure has a blue light transmittance value $T_{azul}$ lower than 95%, calculated as an average transmission value in a range of 410-460 nm according to the following formula:

$$T_{azul} = \sum_{\lambda \in B} \frac{T(\lambda)}{6} \text{ where } B = \{410, 420, 430, 440, 450, 460\}.$$

14. The ophthalmic lens according to any one of claims 1, 6, 9 or 10, wherein the multiple layer structure is on both an inner surface and an outer surface of the ophthalmic lens.

15. The ophthalmic lens according to any one of claims 1, 6, 9 or 10, wherein at least one of said first high refraction index layer or said third high refraction index layer has a refraction index $n_D$ higher than 1.95.

16. The ophthalmic lens according to any one of claims 1, 6, 9 or 10, wherein said second low refraction index layer has a refraction index $n_D$ lower than 1.5.

17. The ophthalmic lens according to any one of claims 1, 6, 9 or 10, wherein said fourth layer has a refraction index $n_D$ lower than 1.65.

18. The ophthalmic lens according to claim 17, wherein said fourth layer has a refraction index $n_D$ between 1.4 and 1.6 and a thickness of the fourth layer is between 50 and 124 nm.

19. The ophthalmic lens according to any one of claims 1, 6, 9 or 10, wherein at least one of said first high refraction index layer or said third high refraction index layer is made up of two high refraction index sub-layers.

20. The ophthalmic lens according to any one of claims 1, 6, 9 or 10, wherein at least one of said second low refraction index layer or said fourth layer is made up of two low refraction index sub-layers.

21. The first ophthalmic lens according to any one of claims 6, 9 or 10, wherein the thickness x of said first high refraction index layer, the thickness y of said second low refraction index layer, the thickness z of said third high refraction index layer and the thickness t of said fourth layer fulfil the following relation:

$$(x \quad y \quad z \quad t) - (129.5 \quad 188.3 \quad 116.0 \quad 89.0) \cdot A \cdot \begin{pmatrix} x - 129.5 \\ y - 188.3 \\ z - 116.0 \\ t - 89.0 \end{pmatrix} \leq 1$$

where $$A = \begin{pmatrix} 8.29 \cdot 10^{4} & -1.76 \cdot 10^{-4}, & -1.18 \cdot 10^{-4} & 1.50 \cdot 10^{-4} \\ -1.76 \cdot 10^{-4} & 3.34 \cdot 10^{-4} & -1.80 \cdot 10^{-5} & -3.50 \cdot 10^{-5} \\ -1.18 \cdot 10^{-4} & -1.80 \cdot 10^{-5} & 7.16 \cdot 10^{-4} & -2.60 \cdot 10^{-4} \\ 1.50 \cdot 10^{-4} & -3.50 \cdot 10^{-5} & -2.60 \cdot 10^{-4} & 5.34 \cdot 10^{-4} \end{pmatrix}.$$

\* \* \* \* \*